United States Patent [19]

Thomas et al.

[11] Patent Number: 5,587,250
[45] Date of Patent: Dec. 24, 1996

[54] HYBRID ENERGY STORAGE SYSTEM

[75] Inventors: George Thomas, Lawrenceville; Georgina Moré, Duluth, both of Ga.

[73] Assignee: Motorola, Inc., Schaumburg, Ill.

[21] Appl. No.: 534,517

[22] Filed: Sep. 27, 1995

[51] Int. Cl.$^6$ ............................................. H01M 16/00
[52] U.S. Cl. ................................................ 429/3; 429/7
[58] Field of Search ................ 429/3, 7, 9; H01M 16/00

[56] References Cited

U.S. PATENT DOCUMENTS

| | | | |
|---|---|---|---|
| 3,288,641 | 11/1966 | Rightmire | 136/6 |
| 3,423,642 | 1/1969 | Plehal et al. | 317/231 |
| 3,538,394 | 11/1970 | Bourgault et al. | 317/230 |
| 4,633,372 | 12/1986 | Calahan et al. | 361/433 |
| 4,830,938 | 5/1989 | McCullough et al. | 429/149 |
| 4,900,643 | 2/1990 | Eskra et al. | 429/241 |
| 4,992,340 | 2/1991 | Tidwell et al. | 429/7 |
| 5,147,739 | 9/1992 | Beard | 429/194 |
| 5,358,798 | 10/1994 | Kleinert et al. | 429/7 |
| 5,421,745 | 6/1995 | Aksoy et al. | 429/7 X |
| 5,439,756 | 8/1995 | Anani et al. | 429/9 |

FOREIGN PATENT DOCUMENTS

| | | | |
|---|---|---|---|
| 59-14681A | 1/1984 | Japan | H01L 31/04 |
| 843035 | 6/1981 | U.S.S.R. | 429/7 |

Primary Examiner—Stephen Kalafut
Attorney, Agent, or Firm—Kenneth M. Massaroni

[57] ABSTRACT

A hybrid energy storage system 10 including a first energy storage device 12, such as a secondary or rechargeable battery, and a second energy storage device 14, such as an electrochemical capacitor. The electrochemical capacitor provides intermittent energy bursts to satisfy the power requires of, for example, pulsed power communication devices. Such devices typically require power pulses in excess of those which conventional battery cells can easily provide for numerous cycles. The first and second energy storage devices may be coupled to output electronics to condition the output of the devices prior to delivering it to the application device.

15 Claims, 5 Drawing Sheets

HYBRID ENERGY STORAGE SYSTEM

TECHNICAL FIELD

This invention relates in general to energy storage devices, and in particular to hybrid rechargeable energy storage devices which provide high power and high capacity for portable electronic devices.

BACKGROUND OF THE INVENTION

Consumer markets continue to request smaller, portable electronic devices which having more functional features. Examples of such devices include two-way and broadcast radio receivers, compact disc players, cellular telephones, and computer devices to name but a few. As portable electronic devices have become smaller, the demand for smaller energy sources, such as batteries, to power such devices has increased. Obviously very small energy storage devices, such as an electrochemical battery cell, may be fabricated for a given electrical device; however, compactness comes at the cost of energy capacity. Accordingly, for many high power applications the energy source is too bulky, too heavy, or doesn't last long enough.

As the energy storage device, such as a battery, is discharged, it becomes unable to provide current at a required level. Thus, even though the battery may retain a substantial charge, it is useless to the device to which it is attached. This problem is exacerbated when the device to which the battery is attached requires high power (i.e., current pulses) in an operating cycle which otherwise requires a much lower operating current. Such is the case with portable communications devices, such as digital two-way radios and cellular phones when in the transmit mode. These power pulses or spikes require significantly higher current outputs than when the device is receiving or in standby mode.

As the physical size of batteries decreases (to meet size requirements of product designers), the capacity of the battery is reduced. This results in device users needing many batteries if they anticipate being away from a battery charging device for extended periods of time. Alternatively, users may carry portable, high speed, charging devices with them. This however is unacceptable, due to the additional weight associated with the charging device.

Prior art attempts to address the high power spikes entailed providing electrolytic capacitors in the application device. This had the disadvantage of increasing substantially the size of the application device, as electrolytic capacitors are typically very large, cylindrical devices. Other attempts are described in U.S. Pat. No. 5,439,756 to Anani, et al, in which an electrical energy storage device is provided. The device disclosed in the '756 patent includes a battery electrode, a capacitor electrode, and a third electrode as the counter electrode for both the battery and the capacitor electrodes. The device also includes electronics to switch the third electrode between the battery electrode and the capacitor electrode.

Accordingly, what is needed is an energy source which is capable of providing sufficient voltage for the high power pulses required of certain devices, while extending the usable life of the energy source. Such a device should be relatively small, and capable of being easily sized and shaped for a given application.

DETAILED DESCRIPTION OF THE PREFERRED EMBODIMENT

Figure 1:
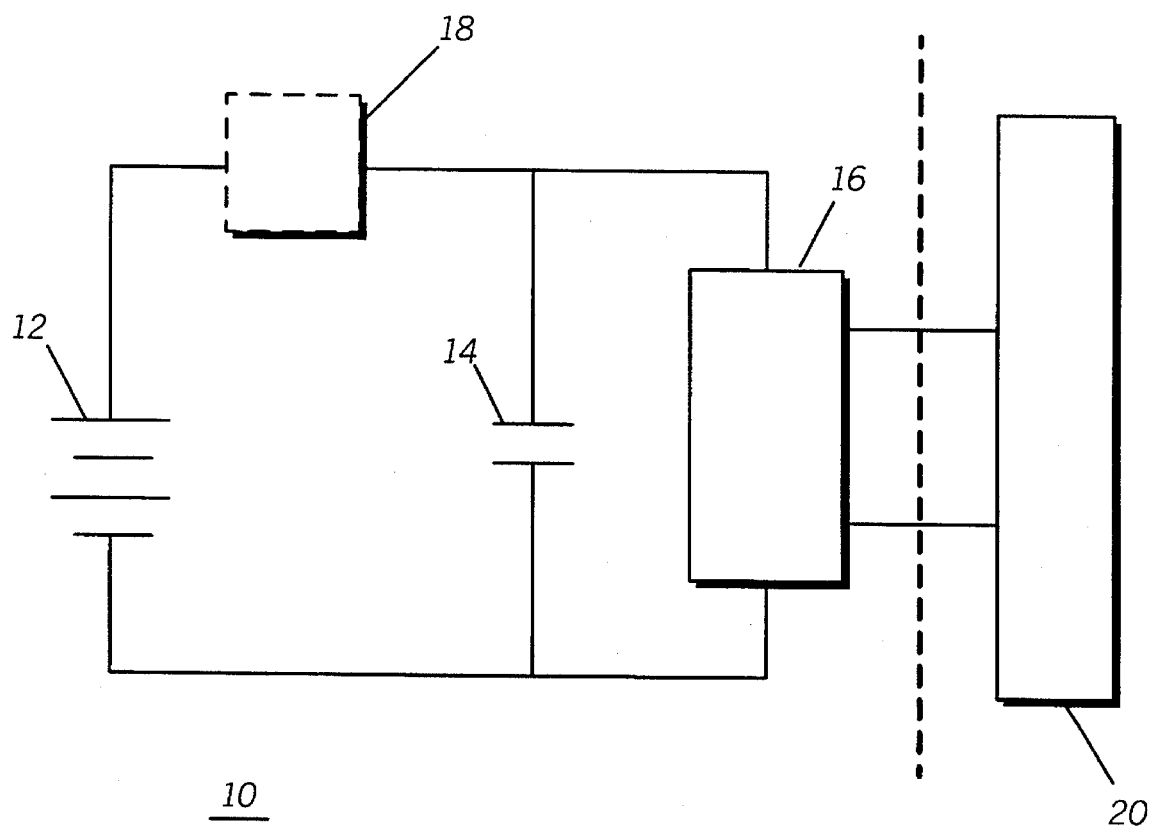
FIG. 1 is a circuit diagram of a hybrid energy storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a circuit diagram of an energy storage device 10 in accordance with the instant invention. The device 10 includes a first energy source 12 having a high energy density, and a long capacity, but which may not be able to provide high power as required by certain applications. The first energy source 12 may thus be one or more conventional battery cells, examples of which include, but are not limited to, a lead-acid battery, a nickel-cadmium battery, a nickel-metal hydride battery, a lithium ion battery, a lithium polymer battery, a lithium ion polymer electrolyte battery, a zinc air battery, and combinations thereof. The battery cell or cells may also be a primary battery, such as a conventional alkaline battery. The battery cell or cells are disposed in a battery pack, as shown hereinbelow in FIG. 3.

The diagram 10 also shows that connected electrically in parallel with the first energy source 12, is a second energy source 14. The second energy source is capable of delivering a burst of high power, as may be required by a particular application. As such, the second energy source 14 is preferably an electrochemical capacitor. The electrochemical capacitor devices typically include at least one electrode fabricated of a metal oxide material such as $RuO_2$. The second electrode may also be a similar or different metal oxide, or may be of another type of material altogether. In this regard, the second electrode may be a polymer such as polyanile, polypyrrole, polyurethane, polyacrylantrim(??), polyacrylomide and combinations thereof. One or both of the electrodes may be fabricated of a carbon based material. The electrolyte may be alkaline or proton conducting.

In a preferred embodiment, the capacitor is a thin device including a first electrode, a second electrode, and an electrolyte disposed therebetween. In a preferred embodiment, the capacitor may be fabricated as disclosed in one or more of U.S. patent application Ser. Nos. 08/415,976 to Bai, et al, entitled "Electrochemical Capacitor and Method of Making Same"; 08/414,816 to Bai, et al entitled "Electrochemical Charge Storage Device Having Constant Voltage Discharge"; 08/513,648 to Bai, et al, entitled Electrochemical Cell Having Solid Polymer Electrolyte and Asymmetrical Inorganic Electrodes now U.S. Pat. No. 5,518,838 ; 08/340,957 to Howard; et al., entitled "Polymer Gel Electrolyte and Electrochemical Capacitor Device Using Same"; 08/505,427 to Howard, entitled "Conducting Polymer Electrodes for Energy Storage Devices and Method of Making Same"; 08/358,294 to Li, et al, entitled "Electrode Material and Electrochemical Devices Using Same"; 08/396,991 to Li, et al., entitled "Modified Electrolyte for Electrochemical Cells" now U.S. Pat. No. 5,510,046 ; 08/498,450 to Li, et al., entitled "Polymer Electrodes for Energy Storage Devices and Method of Making Same"; 08/297,074 to Lian, et al., entitled "Amorphous Cobalt Alloy Electrodes for Aqueous Electrochemical Devices" now U.S. Pat. No. 5,563,765; and U.S. Pat. No. 5,429,895 to Lian, et al., entitled "Nickel Alloy Electrodes for Electrochemical Devices," the disclosures of which are incorporated herein by reference.

Electrically connected to the output of the first and second energy sources is electronic circuitry 16 adapted to condition the output of the first and second energy sources. Accordingly, the circuitry 16 may include, but is not limited to a DC-to-DC converter, a voltage step-up converter, a voltage step down converter, a switch, a diode, a microprocessor, and combinations thereof. Other electronic circuits and/or devices will suggest themselves to one of ordinary skill in the art. Alternatively, the circuitry 16 may provide safety, assuring the absence of short circuiting when connected to a load, such as load 20. In this regard, the circuitry may include a diode, transistor, or a switch.

Optionally disposed between the first and second energy sources is a second electronic circuit or component 18 (in phantom). Circuitry 18 is provided to electrically disconnect the first energy source from the second energy source. This may be desirable in certain situations, such as when the second energy source is a capacitor and such capacitor has a high leakage current. In such a situation, the first energy source, such as a battery would be continuously recharging the capacitor, even when the energy storage device 10 is not in use. Hence, the energy stored in device 10 may experience significant self discharge. Circuitry 18 may thus disconnect the first and second energy sources when the device 10 is not connected to load 20. Accordingly, circuitry 18 may be a diode or diodes, a transistor, a switch, a MOSFET, or combinations thereof.

As noted above, the problems occasioned by high power spikes or peaks are most frequently observed in devices requiring brief, intermittent high power levels. Pulsed power communication devices such as digital cellular phones, two-way radios, and talk-back pagers all make such demands of their associated energy sources. Thus, the load 20 contemplated herein is a device which requires high power spikes, such as those applications described above. Other examples include power tools, which require a burst of power to, for example, start turning a drill bit, or a personal computer to start the disc drive or the display backlight. The pulses in these devices are more transient, and are not the uniform, repeating pulses experienced in digital communication.

Figure 2:
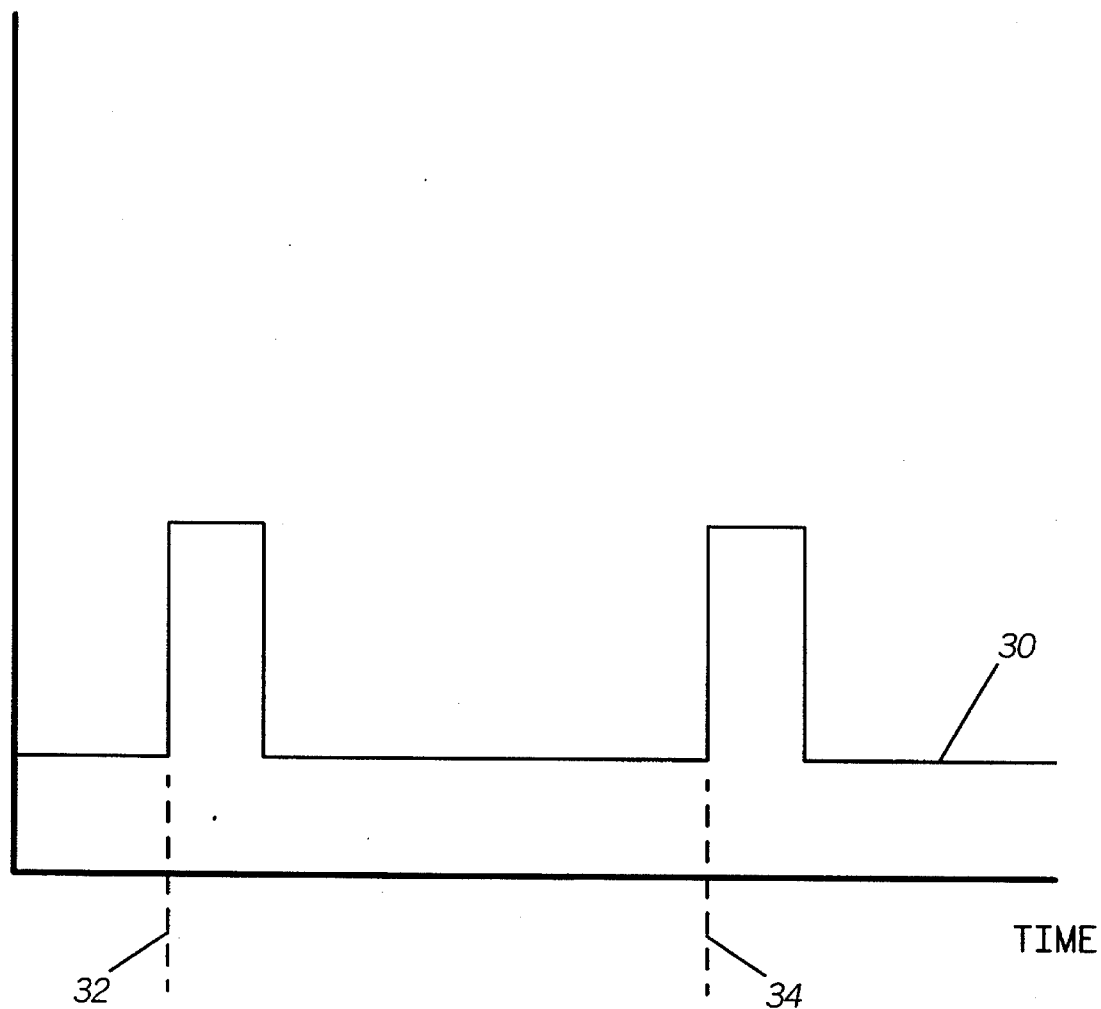
FIG. 2 is a chart illustrating the power requirements experienced during the duty cycle of a portable digital communications device.

In the communications field power spike problems have become acute since the advent of digital communications, in which some communication applications require power pulses on the order of 5 amperes, for relatively long durations, i.e., up to 20 milliseconds, and with a 10Hz frequency. Other communications systems such as GSM (General Systems Mobile) have relatively narrow pulses and lower currents, but applied with higher frequency, on the order of 200 Hz. For example, FIG. 2 illustrates the power consumption during the duty cycle of, for example, a digital cellular phone. More specifically, FIG. 2 illustrates a chart in which time is plotted on the S Axis versus current draw, in amps along the Y Axis. The duty cycle for the GSM phone illustrated in FIG. 2 is approximately 5.1 milliseconds (mSec) long. During the duty cycle, there is a peak burst current of approximately 1.42 amps at 6 volts which is required for approximately 0.5 (mSec). During the balance of the duty cycle, the average current drawn is approximately 0.22 amps. This is required for 4.6 (mSec). The frequency of the entire duty cycle is in excess of 200 Hz, specifically 217 Hz. Line 30 in FIG. 2 illustrates the duty cycle, which is specifically identified by points 32 and 34. More particularly, point 32 is the point at which the duty cycle begins and which is concurrent with the initiation of the current period of the first cycle. Point 34 is the end point of the first cycle, which is also concurrent with the beginning of the current pulse of the next following duty cycle.

The effect of pulse currents, as illustrated in FIG. 2, are more acute under certain extreme conditions. For example, certain battery types, such as lithium ion batteries, are adversely affected by excess heat. Specifically, electronic series resistance (ESR) increases substantially when the device is kept in elevated temperatures. Accordingly, when the temperature of a lithium ion cell is elevated, its ability to respond to the burst current required of a digital cellular phone, may be compromised.

Similarly, nickel metal hydride batteries can deliver significantly less than full power (on the order of less than 40% of stored energy) at low temperatures. Accordingly, at temperatures as low as 0° C. the performance of a nickel metal hydride battery may be so severely compromised that it cannot power a digital cellular phone.

Figure 3:
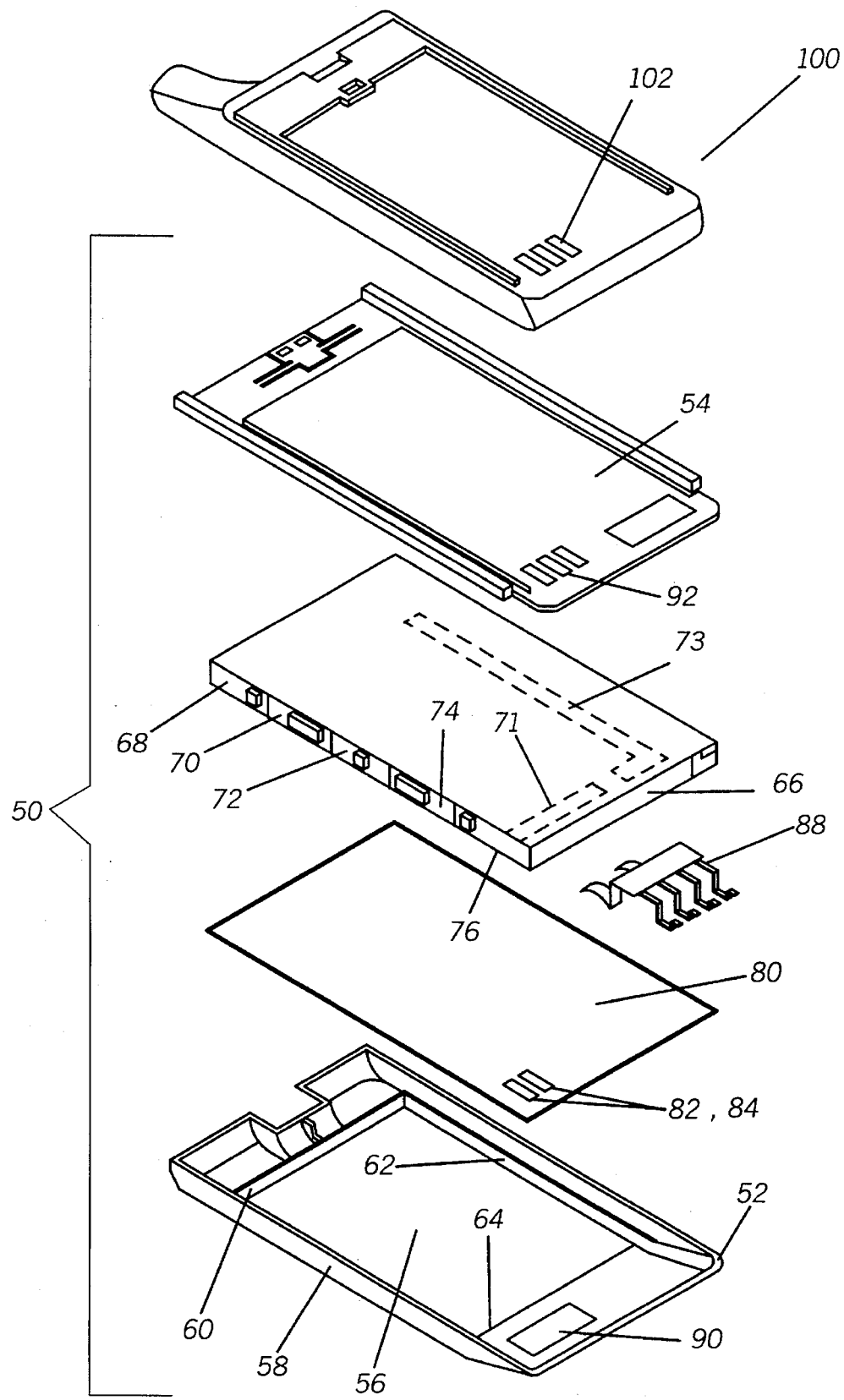
FIG. 3 is an exploded perspective view of a hybrid energy storage device in accordance with the instant invention.

Referring now to FIG. 3 there is illustrated therein an exploded perspective view of a hybrid energy storage system in accordance with the instant invention. The hybrid system 50 comprises a power pack having a housing base 52 and a housing cover 54. The housing base 52 includes a flat bottom portion 56 and four side walls 58, 60, 62, 64 extending therefrom. The flat portion and side walls are adapted to engage the first and second energy sources, as described hereinbelow.

Disposed in the housing base is the first energy source, 66. The first energy source 66 is one or more batteries of the type described hereinabove. As illustrated herein, the first energy source comprises five discrete cells 68, 70, 72, 74, 76, electrically connected in series and packaged in shrink wrap, in a manner well know in the art. Alternatively, the batteries may be connected in parallel for a particular application. It is also to be understood that while five cells are illustrated, any number of batteries may be used in order to address the power needs of a particular application. The five cells are also provided with electrically conductive leads 71, 73, for coupling the cells to a contact assembly 88, as described below.

Disposed adjacent the first energy source 66 is the second energy source 80, which is a high power energy source such as an electrochemical capacitor. As may be appreciated from FIG. 3, the capacitor is a flat, substantially planar device. Such a capacitor device may be fabricated according to one or more of the commonly assigned patent applications identified above, the disclosures of which are incorporated herein by reference. The capacitor 80 includes first and second contacts 82, 84 for electrically coupling to the batteries and the electronics. The ability to provide a substantially planar electrochemical capacitor device capable of discharging sufficient power to satisfy the needs of pulsed power communications devices is essential to easily maintain form factors; however, other sizes and shapes of electrochemical capacitors will also work equally well.

The batteries and capacitor are electrically coupled together and to the electronic circuit or component, as described above with respect to FIG. 1. The electronics may further include contacts for electrically coupling the hybrid energy storage device to a load. In this regard, the electronics may be part of a contact assembly 88, such as a contact block, a plurality of discrete contacts, a plurality of contact pins or pogo pins, or a contact plug, for example. The contact assembly 88 protrudes through an opening in one or both of the housing base and the housing cover. Accordingly, housing base 2 includes opening 90, while housing cover 54 includes opening 92. The first and second energy sources are enclosed in the housing base by the housing cover, which is affixed to the housing base by known techniques such as, for example, interlocking snaps, adhesives, or ultrasonic welding, to name a few.

Disposed adjacent to device 50 is the load, in this case a portable communications device 100, such as digital cellular telephone or two-way radio. The contact assembly 88 electrically connects the first and second energy sources of the device 50 to the load via contacts 102 on the load.

Figure 4:
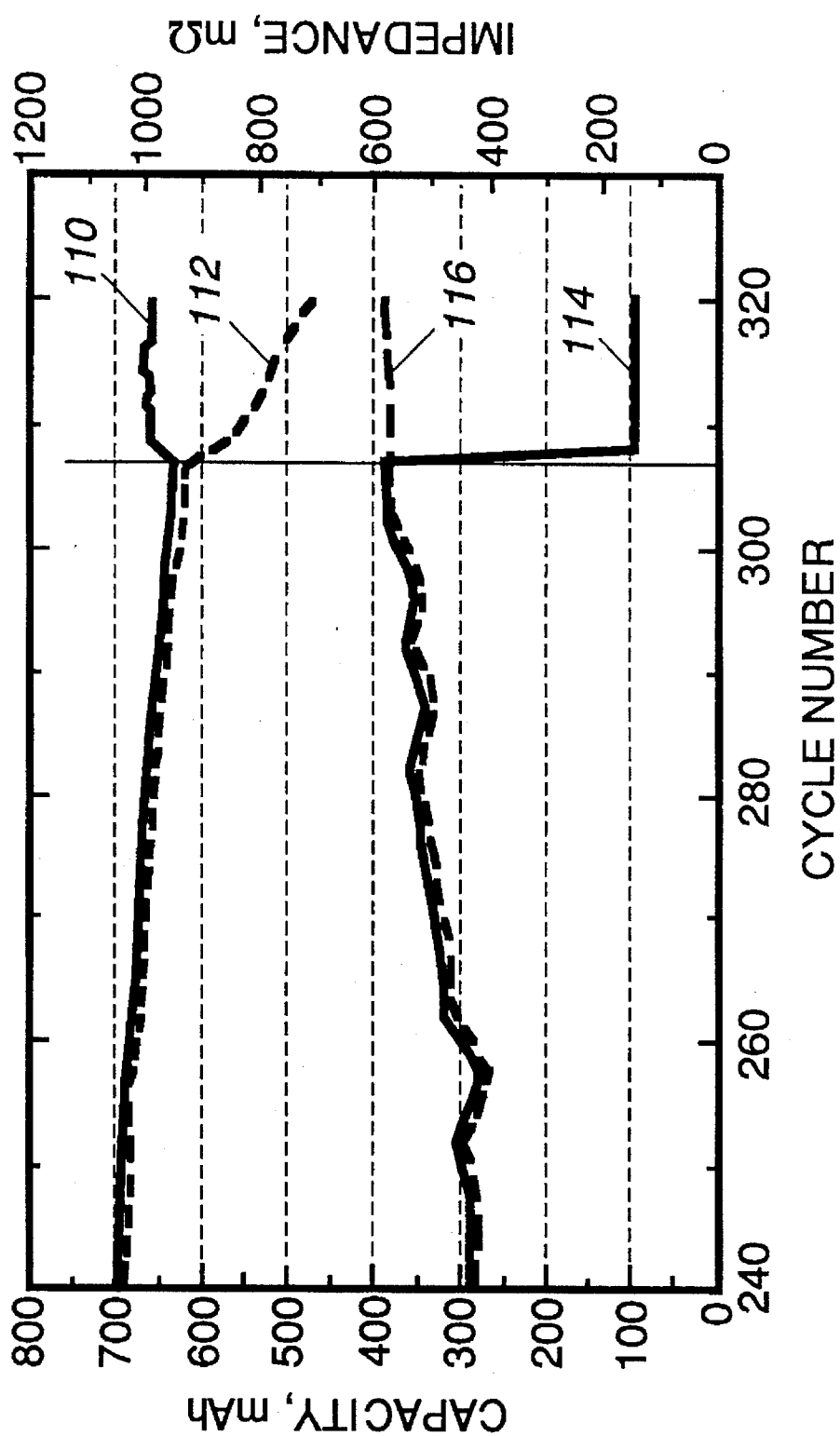
FIG. 4 is a series of discharge curves comparing a standard battery with an energy storage device in accordance with the instant invention.

A device as illustrated in FIG.'s 1–3 were tested against a conventional nickel metal hydride (NiMH) electrochemical cell. The results are shown in FIG. 4. More particularly, FIG. 4 compares both capacity and impedance versus cycle number for a nickel metal hydride battery of five cells and a device according to the instant invention. Both devices were tested with constant current discharge out to 308 cycles; thereafter a pulse profile characteristic of a digital GSM communications device was applied.

The top two curves of FIG. 4 illustrate capacity versus cycle number for the two test devices, and specifically, the hybrid device of the instant invention is shown by line 110, while line 112 shows the performance of the NiMH battery alone. As may be appreciated from a perusal of FIG. 4, capacity for the NiMH device drops off dramatically, while the capacity of the hybrid device actually improves. The impedance characteristics of the two devices show similar dramatic differences. Specifically, line 114 shows the impedance for the hybrid device to be substantially lower than for the NiMH device illustrated by line 116. One may thus appreciate from FIG. 4 that the NiMH device has little if any remaining energy usable by a device having the high power pulse requirements of a digital GSM device. Conversely, the hybrid device will apparently deliver a substantially larger number of cycles for the same application.

Figure 5:
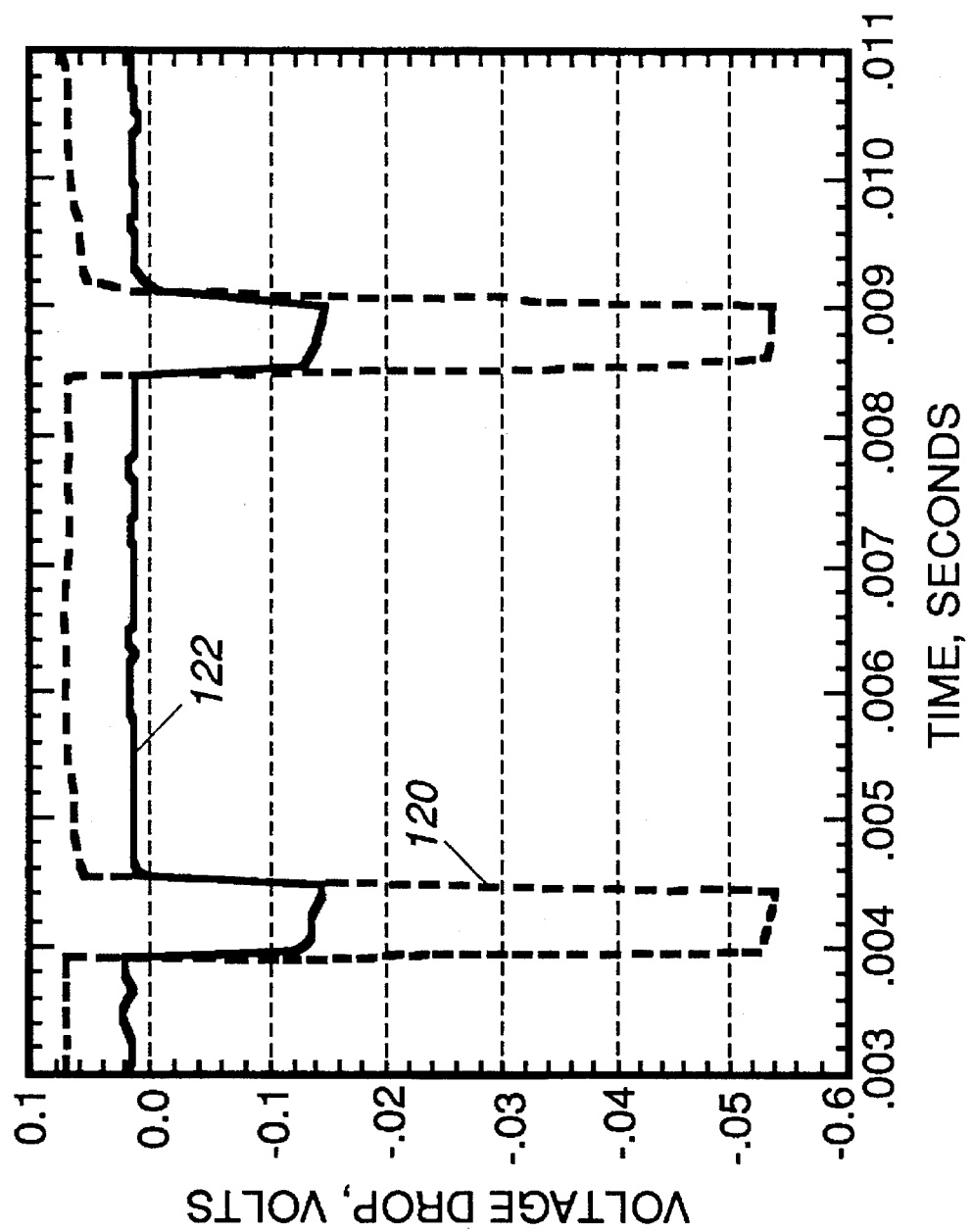
FIG. 5 is a chart comparing voltage drop of a standard battery versus an energy storage device in accordance with the instant invention.

Referring now to FIG. 5, there is illustrated therein a chart demonstrating the difference in voltage drop versus seconds for a standard nickel metal hydride battery versus a hybrid device in accordance with the instant invention. Each of said devices was pulsed according to a GSM duty cycle such as that illustrated hereinabove with respect to FIG. 2. From FIG. 5 one may appreciate that the voltage drop experienced by the standard nickel metal hydride battery, as illustrated by line 120 is significantly greater than in the hybrid device according to the instant invention, illustrated by line 122. It may thus be appreciated that if the energy storage device, either battery or hybrid, is already operating near the cutoff voltage of the cellular phone to which it is attached, a large voltage drop such as that illustrated by line 120 will cause the communications device shut off. This is an unacceptable result for most users.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A hybrid energy storage system comprising:
   a first energy storage device consisting of a secondary battery selected from the group consisting of lead-acid batteries, nickel cadmium batteries, nickel metal hydride batteries, lithium ion batteries, lithium polymer batteries, and combinations thereof for providing a constant current output of less than 1 ampere;
   a second energy storage device consisting of an electrochemical capacitor device for providing intermittent bursts of current greater than 1 ampere; and
   output electronics electrically coupled to said first and second energy storage devices for conditioning the output thereof, and for electrically coupling said energy storage devices to a load.

2. A hybrid energy storage system as in claim 1, wherein said energy storage system is coupled to a load and said load is a pulsed power communications device.

3. A hybrid energy storage system as in claim 2, wherein said pulsed power communications device requires power pulses of at least 5 amperes, for at least 10 milliseconds and a frequency of 10Hz.

4. A hybrid energy storage system as in claim 2, wherein said pulsed power communications device requires power pulses of at least 1.0 amperes, for at least 0.56 milliseconds, and a frequency of 200Hz.

5. A hybrid energy storage system as in claim 1, wherein said electrochemical capacitor comprises a first and second electrode with an electrolyte disposed therebetween, and wherein at least one of said electrodes is a metal oxide electrode and the electrolyte is a proton conducting electrolyte.

6. A hybrid energy storage system as in claim 5, wherein said second electrode is a metal oxide electrode.

7. A hybrid energy storage system as in claim 5, wherein said second electrode is a conducting polymer electrode.

8. A hybrid energy storage system for a pulsed power communications device comprising:
   a first energy storage device consisting of a secondary battery selected from the group consisting of lead-acid batteries, nickel cadmium batteries, nickel metal hydride batteries, lithium ion batteries, lithium polymer batteries, and combinations thereof for providing a constant current output of less than 1 ampere; and
   a second energy storage device consisting of a substantially planar, electrochemical capacitor device for providing current pulses of at least 5 amperes, for at least 10 milliseconds and a frequency of 10Hz.

9. A hybrid energy storage system as in claim 8, further comprising output electronics electrically coupled to said first and second energy storage devices for conditioning the output thereof, and for electrically coupling said energy storage devices to a load.

10. A hybrid energy storage system as in claim 8, wherein said pulsed power communications device requires power pulses of at least 1.0 amperes, for at least 0.56 milliseconds with a frequency of 200Hz.

11. A hybrid energy storage system as in claim 8, wherein said electrochemical capacitor comprises a first and second electrode with an electrolyte disposed therebetween, and wherein at least one of said electrodes is a metal oxide electrode and the electrolyte is a proton conducting electrolyte.

12. A hybrid energy storage system as in claim 11, wherein said second electrode is a metal oxide electrode.

13. A hybrid energy storage system as in claim 11, wherein said second electrode is a conducting polymer electrode.

14. A hybrid energy storage system as in claim 8, wherein said first energy source is a nickel metal hydride battery, and said second energy source is an electrochemical capacitor comprising at least one metal oxide electrode.

15. A hybrid energy storage system for a pulsed power communications device, said system comprising a first energy storage device consisting of a secondary battery selected from the group consisting of lead-acid batteries, nickel cadmium batteries, nickel metal hydride batteries, lithium ion batteries, lithium polymer batteries, and combinations thereof for providing a constant current output, a second energy storage device consisting of an electrochemical capacitor having a first electrode fabricated of a metal oxide, a second electrode fabricated of either a metal oxide or a conducting polymer, and an electrolyte disposed between said electrodes, said second energy storage device providing power pulses of 5 amperes, for at least 10 milliseconds and a frequency of 10Hz.

* * * * *